(12) United States Patent
Chen (10) Patent No.: US 11,218,974 B2
(45) Date of Patent: Jan. 4, 2022

(54) METHOD, TERMINAL DEVICE AND NETWORK DEVICE FOR TRANSMITTING SIGNALS

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 30 days.

(21) Appl. No.: 16/614,998

(22) PCT Filed: Jun. 29, 2017

(86) PCT No.: PCT/CN2017/090809
§ 371 (c)(1),
(2) Date: Nov. 19, 2019

(87) PCT Pub. No.: WO2019/000321
PCT Pub. Date: Jan. 3, 2019

(65) Prior Publication Data
US 2020/0205082 A1    Jun. 25, 2020

(51) Int. Cl.
*H04W 52/04* (2009.01)
*H04W 52/14* (2009.01)
(Continued)

(52) U.S. Cl.
CPC ......... *H04W 52/146* (2013.01); *H04L 5/0051* (2013.01); *H04W 52/325* (2013.01);
(Continued)

(58) Field of Classification Search
CPC ............. H04W 72/046; H04W 52/242; H04W 72/0473; H04W 72/04; H04W 52/146;
(Continued)

(56) References Cited

U.S. PATENT DOCUMENTS

2013/0077571 A1* 3/2013 Papasakellariou .. H04W 74/004
370/328

FOREIGN PATENT DOCUMENTS

| CN | 102149182 A | 8/2011 |
|----|-------------|--------|
| CN | 103369654 A | 10/2013 |

(Continued)

OTHER PUBLICATIONS

European Search Report dated Apr. 29, 2020 from EP 17916124.5.
(Continued)

*Primary Examiner* — Tu X Nguyen
(74) *Attorney, Agent, or Firm* — Young Basile Hanlon & MacFarlane, P.C.

(57) ABSTRACT

A method, terminal device, and network device for transmitting signals are provided. The method may include: a terminal device determining sounding reference signal (SRS) resource indication information corresponding to a target uplink signal; the terminal device determining a first power control parameter of the target uplink signal according to the SRS resource indication information; the terminal device determining a transmitting power of the target uplink signal according to the first power control parameter; the terminal device sending the target uplink signal to a network device according to the transmitting power.

14 Claims, 4 Drawing Sheets

(51) Int. Cl.
  *H04L 5/00* (2006.01)
  *H04W 52/32* (2009.01)
  *H04W 52/54* (2009.01)
  *H04W 72/04* (2009.01)
  *H04W 74/08* (2009.01)
  *H04W 52/08* (2009.01)
  *H04W 52/10* (2009.01)

(52) U.S. Cl.
  CPC ......... *H04W 52/54* (2013.01); *H04W 72/042* (2013.01); *H04W 74/0833* (2013.01); *H04W 52/08* (2013.01); *H04W 52/10* (2013.01)

(58) Field of Classification Search
  CPC ..... H04W 76/27; H04W 52/04; H04W 52/18; H04W 52/58; H04W 52/34; H04B 7/0452
  See application file for complete search history.

(56) References Cited

FOREIGN PATENT DOCUMENTS

| | | |
|---|---|---|
| CN | 103391607 A | 11/2013 |
| EP | 2849517 A1 | 3/2015 |
| EP | 3038281 A1 | 6/2016 |
| JP | 2013187818 A | 9/2013 |
| JP | 2013236289 A | 11/2013 |
| RU | 2428808 C2 | 9/2011 |
| WO | 2008097965 A2 | 8/2008 |
| WO | 2010091422 A1 | 8/2010 |
| WO | 2011005537 A2 | 1/2011 |
| WO | 201316553 A1 | 1/2013 |

OTHER PUBLICATIONS

English translation of First Russian Office Action dated Jun. 9, 2020 from RU 2019139069/07(076799).
3GPP TSG RAN WG1 NR Ad-Hoc Meeting; R1-1709948; Qingdao, China; Jun. 27-30, 2017.
3GPP TSG RAN WG1 NR Ad-Hoc#2; R1-1710209; Qingdao, China, P.R China; Jun. 27-30, 2017.
3GPP TSG RAN WG1 NR Ad-Hoc Meeting; R1-1710459; Qingdao, China; Jun. 27-30, 2017.
3GPP TSG RAN WG1 NR Ad Hoc#2; R1-1710043; Qingdao, China; Jun. 27-30, 2017.
3GPP TSG RAN WG1 NR Ad-Hoc#2; R1-1710356; Qingdao, P.R. China; Jun. 27-30, 2017.
Korean Office Action with English Translation for KR Application 10-2019-7036848 dated Nov. 26, 2020.
Canada Examination Report for CA Application 3,064,824 dated Jan. 28, 2021.
Communication pursuant to Article 94(3) EPC Examination for EP Application 17916124.5 dated Jan. 28, 2021.
Japanese Office Action with English Translation for JP Application 2019-568313 dated Apr. 20, 2021. (17 pages).
Indian Examination Report for IN Application 201917047118 dated Mar. 31, 2021. (6 pages).
Singapore Written Opinion for SG Application 11201911140V dated May 21, 2021. (7 pages).
Chile Examination Report with English Translation for CL Application 2019-003806 dated Apr. 23, 2021. (19 pages).
Communication pursuant to Article 94(3) EPC for EP Application 17916124.5 dated May 21, 2021. (7 pages).
Samsung, UL beam management, 3GPP TSG RAN WG1 NR Ad-Hoc#2, R1-1710653, Jun. 27-30, 2017. (7 pages).
Intel Corporation, Details for UL Beam Management, 3GPP TSG-RAN WG1 NR AdHoc #2, R1-1710525, Jun. 27-30, 2017. (9 pages).
Communication pursuant to Article 94(3) EPC for EP Application 17916124.5 dated Sep. 3, 2021. (5 pages).
Korean Grant of Patent with English Translation for KR Application 10-2019-7036848 dated Jul. 22, 2021. (4 pages).
Taiwan Office Action with English Translation for TW Application 107120598 dated Jun. 10, 2021. (18 pages).

\* cited by examiner

METHOD, TERMINAL DEVICE AND NETWORK DEVICE FOR TRANSMITTING SIGNALS

CROSS-REFERENCE TO RELATED APPLICATION(S)

This application is a 371 application of International Application No. PCT/CN2017/090809, filed on Jun. 29, 2017, the entire disclosure of which is hereby incorporated by reference.

TECHNICAL FIELD

Implementations of the present disclosure relate to the field of communication, and more particularly, relate to a method for transmitting signals, a terminal device, and a network device.

BACKGROUND

For uplink signals, power control of a terminal is of great significance in power saving and inter-cell interference suppression. Therefore, how to improve accuracy of uplink power control is always a research issue.

SUMMARY

In view of this, the implementations of the present disclosure provide a method, terminal device and network device for transmitting signals.

In a first aspect, there is provided a method for transmitting signals. The method includes: a terminal device determines sounding reference signal (SRS) resource indication information corresponding to a target uplink signal; the terminal device determines a first power control parameter of the target uplink signal according to the SRS resource indication information; the terminal device determines a transmission power of the target uplink signal according to the first power control parameter; and the terminal device sends the target uplink signal to a network device according to the transmission power.

The SRS resource indication information may be indication information for indicating a SRS resource. The network device may preconfigure one or more SRS resources or agree on one or more SRS resources by a protocol, and the network device may preconfigure that a set of independent power control parameters corresponds to different SRS resources.

The target uplink signal may be a Physical Uplink Shared Channel (PUSCH), a Physical Uplink Control Channel (PUCCH), a Physical Random Access Channel (PRACH), and SRS. The target uplink signal may be a Phase Tracking Reference Signal (PTRS), or may be a Demodulation Reference Signal (DMRS), etc.

The sounding reference signal (SRS) resource indication information corresponding to the target uplink signal may refer to that the network device and the terminal device have agreed in advance or the network device has configured that some indication way belongs to a specific uplink signal.

The first power control parameter may be any one or any combination of multiple parameters in a calculation formula of transmission power.

SRSs sent on different SRS resources may adopt different beams. That is, there is a corresponding relationship between at least two of beams, SRS resources, SRS resource indication information, and power control parameters.

The network device may explicitly indicate a reference power control parameter corresponding to the target uplink signal, wherein the reference power control parameter is a power control parameter used for sending a SRS on a certain SRS resource.

In one possible implementation, the method further includes: the terminal device receives first information sent by the network device, wherein the first information carries the SRS resource indication information; the determining, by the terminal device, the sounding reference signal (SRS) resource indication information corresponding to the target uplink signal, includes: the terminal device determines the SRS resource indication information from the first information.

The first information may be a high layer signaling (such as a Radio Resource Control (RRC) signaling, a Media Access Control (MAC) signaling), a DCI signaling, system information, and broadcasting, etc.

In one possible implementation, in a case that the target uplink signal is a physical uplink shared channel (PUSCH), the first information is downlink control information (DCI) for scheduling the PUSCH; or in a case that the target uplink signal is a physical random access channel (PRACH), the first information is system information or a high layer signaling; or in a case that the target uplink signal is a sounding reference signal (SRS), the first information is a high layer signaling or downlink control information (DCI).

In a case that the target uplink signal is a periodic SRS, the terminal device may carry SRS resource indication information corresponding to the periodic SRS in an RRC signaling configuring a type of the SRS; in a case that the target uplink signal is an aperiodic SRS, the terminal device may obtain SRS resource indication information corresponding to the aperiodic SRS from DCI triggering transmission of the aperiodic SRS.

In one possible implementation, in a case that the target uplink signal is a physical uplink control channel (PUCCH), the first information is a high layer signaling for indicating a resource of the PUCCH; or in a case that the target uplink signal is a physical uplink control channel (PUCCH), the first information is downlink control information (DCI) latest received by the terminal device for scheduling a physical uplink shared channel (PUSCH); or in a case that the target uplink signal is a physical uplink control channel (PUCCH), the first information is downlink control information (DCI) carrying a Transmit Power Control (TPC) command for indicating a closed-loop power adjustment value of the PUCCH; or in a case that the target uplink signal is a physical uplink control channel (PUCCH), the first information is a Radio Resource Control (RRC) signaling or a medium access control (MAC) signaling.

In one possible implementation, in a case that the target uplink signal is a physical uplink control channel (PUCCH), determining, by the terminal device, the sounding reference signal (SRS) resource indication information corresponding to the target uplink signal, includes: the terminal device determines SRS resource indication information corresponding to a format of the PUCCH according to the format of the PUCCH.

The network device may preconfigure that different PUCCH formats correspond to different SRS resource indication information.

In one possible implementation, in a case that the target uplink signal is a phase tracking reference signal (PTRS), determining, by the terminal device, the sounding reference signal (SRS) resource indication information corresponding to the target uplink signal, includes: the terminal device determines SRS resource indication information corresponding to a first PUSCH as SRS resource indication information corresponding to the PTRS, wherein a demodulation reference signal (DMRS) for demodulating the first PUSCH has an association relationship with the PTRS.

In one possible implementation, the determining, by the terminal device, the first power control parameter of the target uplink signal according to the SRS resource indication information, includes: the terminal device determines a power control parameter corresponding to a SRS resource indicated by the SRS resource indication information as the first power control parameter of the target uplink signal.

The terminal device may further determine a power control parameter corresponding to a SRS resource indicated by the network device plus a certain offset as the first power control parameter of the target uplink signal.

In one possible implementation, the first power control parameter includes at least one of following: a path loss value for calculating the transmission power, information about a downlink signal for measuring a path loss value for calculating the transmission power, an open-loop power control parameter, and a closed-loop power control parameter.

The power control parameter may be a target power $P_O$, a path loss factor a, or a closed-loop power control factor f(i), etc.

In one possible implementation, before the terminal device determines the sounding reference signal (SRS) resource indication information corresponding to the target uplink signal, the method further includes: the terminal device receives configuration information sent by the network device, wherein the configuration information is used for indicating a corresponding relationship between at least one SRS resource and at least one power control parameter, and the at least one SRS resource includes a SRS resource indicated by the SRS resource indication information.

The network device may preconfigure each SRS resource and corresponding SRS resource indication information and inform the terminal device of the corresponding relationship, or the corresponding relationship may be agreed on by the protocol.

In one possible implementation, the method further includes: the terminal device determines a transmission power of the target uplink signal by using a power control parameter preconfigured by the network device.

In one possible implementation, the determining, by the terminal device, the first power control parameter of the target uplink signal according to the SRS resource indication information, includes: the terminal device determines the first power control parameter of the target uplink signal according to the SRS resource indication information and an uplink multiple access mode used for the target uplink signal.

In one possible implementation, the determining, by the terminal device, the first power control parameter of the target uplink signal according to the SRS resource indication information and the uplink multiple access mode used for the target uplink signal, includes: the terminal device determines the first power control parameter of the target uplink signal according to a power control parameter corresponding to a SRS resource indicated by the SRS resource indication information and the uplink multiple access mode used for the target uplink signal.

In one possible implementation, the uplink multiple access mode used for the target uplink signal is Discrete Fourier Transform-Spread-Orthogonal Frequency Division Multiplexing (DFT-S-OFDM) or Cyclic Prefix-Orthogonal Frequency Division Multiplexing (CP-OFDM).

In a case that the uplink multiple access mode used by the target uplink signal is Discrete Fourier Transform-Spread-Orthogonal Frequency Division Multiplexing (DFT-S-OFDM), the terminal device determines a power control parameter corresponding to a SRS resource indicated by the SRS resource indication information as the first power control parameter of the target uplink signal; or in a case that the uplink multiple access mode used by the target uplink signal is Cyclic Prefix-Orthogonal Frequency Division Multiplexing (CP-OFDM), the terminal device determines a power control parameter corresponding to a SRS resource indicated by the SRS resource indication information plus a preset offset as the first power control parameter of the target uplink signal.

In one possible implementation, determining, by the terminal device, the transmission power of the target uplink signal according to the first power control parameter, includes: the terminal device determines the transmission power of the target uplink signal according to the first power control parameter, and a second power control parameter preconfigured by the network device for the target uplink signal.

In a second aspect, there is provided a method for transmitting signals. The method includes: a network device sends SRS resource indication information corresponding to a target uplink signal to a terminal device, wherein the SRS resource indication information is used for the terminal device to determine a first power control parameter of the target uplink signal; and the network device receives the target uplink signal sent by the terminal device based on the first power control parameter.

In one possible implementation, the target uplink signal is a physical uplink shared channel (PUSCH), a physical uplink control channel (PUCCH), a physical random access channel (PRACH), a phase tracking reference signal (PTRS), or a sounding reference signal (SRS).

In one possible implementation, in a case that the target uplink signal is a physical uplink shared channel (PUSCH), the SRS resource indication information is carried in downlink control information (DCI) for scheduling the PUSCH; or in a case that the target uplink signal is a physical random access channel (PRACH), the SRS resource indication information is carried in system information or a high layer signaling; or in a case that the target uplink signal is a sounding reference signal (SRS), the SRS resource indication information is carried in a high layer signaling or downlink control information (DCI).

In one possible implementation, in a case that the target uplink signal is a physical uplink control channel (PUCCH), the SRS resource indication information is carried in a high layer signaling for indicating a resource of the PUCCH; or in a case that the target uplink signal is a physical uplink control channel (PUCCH), the SRS resource indication information is carried in downlink control information (DCI) latest received by the terminal device for scheduling a physical uplink shared channel (PUSCH); or in a case that the target uplink signal is a physical uplink control channel (PUCCH), the SRS resource indication information is carried in downlink control information (DCI) carrying a transmit power control (TPC) command for indicating a closed-loop power adjustment value of the PUCCH; or in a case that the target uplink signal is a physical uplink control channel (PUCCH), the SRS resource indication information is carried in a radio resource control (RRC) signaling or a medium access control (MAC) signaling.

In one possible implementation, the first power control parameter includes at least one of following: a path loss value for calculating the transmission power, information about a downlink signal for measuring a path loss value for calculating the transmission power, an open-loop power control parameter, and a closed-loop power control parameter.

In one possible implementation, the method further includes: the network device sends configuration information to the terminal device, wherein the configuration information is used for indicating a corresponding relationship between at least one sounding reference signal (SRS) resource and at least one power control parameter, and the at least one SRS resource includes a SRS resource indicated by the SRS resource indication information.

In a third aspect, a terminal device is provided, which is used for performing the method in the first aspect or any possible implementation mode of the first aspect. The terminal device includes units for executing the method of first aspect or in any possible implementation of the first aspect.

In a fourth aspect, a network device is provided, which is used for performing the method in the above second aspect or any possible implementation mode of the second aspect. The network device includes units used for performing the method in the second aspect or any possible implementation of the second aspect.

In a fifth aspect, a terminal device is provided. The terminal device includes a memory, a processor, an input interface, and an output interface. The memory, the processor, the input interface and the output interface are connected through a bus system. The memory is used for storing instructions, and the processor is used for executing the instructions stored in the memory to perform the method in the first aspect or any possible implementation of the first aspect.

In a sixth aspect, a network device is provided. The network device includes a memory, a processor, an input interface, and an output interface. The memory, the processor, the input interface and the output interface are connected through a bus system. The memory is used for storing instructions, and the processor is used for executing the instructions stored in the memory to perform the method in the second aspect or any possible implementation of the second aspect.

In a seventh aspect, a computer storage medium is provided for storing computer software instructions for executing the method of the first aspect or any possible implementation of the first aspect, or the method of the second aspect or any possible implementation of the second aspect. The computer software instructions include programs designed for executing the aspects.

In an eighth aspect, a computer program product containing instructions is provided. When the instructions are run on a computer, the computer is caused to perform the method of the first aspect or any one of optional implementations of the first aspect, or the method of the second aspect or any one of optional implementations of the second aspect.

These aspects and other aspects of the present disclosure will be more simply understood in following description of the implementations.

DETAILED DESCRIPTION

Technical solutions in the implementations of the present disclosure will be clearly and completely described below with reference to the drawings in the implementations of the present disclosure.

It should be understood that the technical solutions of the implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, a New Radio (NR) or future 5G System.

In particular, the technical solutions of the implementations of the present disclosure may be applied to various communication systems based on non-orthogonal multiple access technologies, such as a Sparse Code Multiple Access (SCMA) system, and a Low Density Signature (LDS) system. Of course, the SCMA system and the LDS system may also be referred to as other names in the communication field. Further, the technical solutions of the implementations of the present disclosure may be applied to multicarrier transmission systems employing non-orthogonal multiple access technologies, such as an Orthogonal Frequency Division Multiplexing (OFDM) system, Filter Bank Multi-Carrier (FBMC) system, Generalized Frequency Division Multiplexing (GFDM) system, and Filtered OFDM (F-OFDM) system based on a non-orthogonal multiple access technology.

A terminal device in the implementations of the present disclosure may be referred to a user equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. An access terminal may be a cellular phone, a cordless phone, a session initiation protocol (SIP) phone, a wireless local loop (WLL) station, a personal digital assistant (PDA), a handheld device with a wireless communication function, a computing device or other processing device connected to a wireless modem, an on-board device, a wearable device, a terminal device in a future 5G network, or a terminal device in a future evolved Public Land Mobile Network (PLMN), etc., which is not limited in the implementations of the present disclosure.

A network device in the implementations of the present disclosure may be a device for communicating with a terminal device, and the network device may be a Base Transceiver station (BTS) in GSM or CDMA, a NodeB (NB) in a WCDMA system, an evolutional NodeB (eNB or eNodeB) in an LTE system, or a wireless controller in a scenario of a Cloud Radio Access Network (CRAN), or the network device may be a relay station, an access point, an on-board device, a wearable device, a network device in a future 5G network, or a network device in a future evolved Public Land Mobile Network (PLMN), etc., which is not limited in the implementations of the present disclosure.

Figure 1:
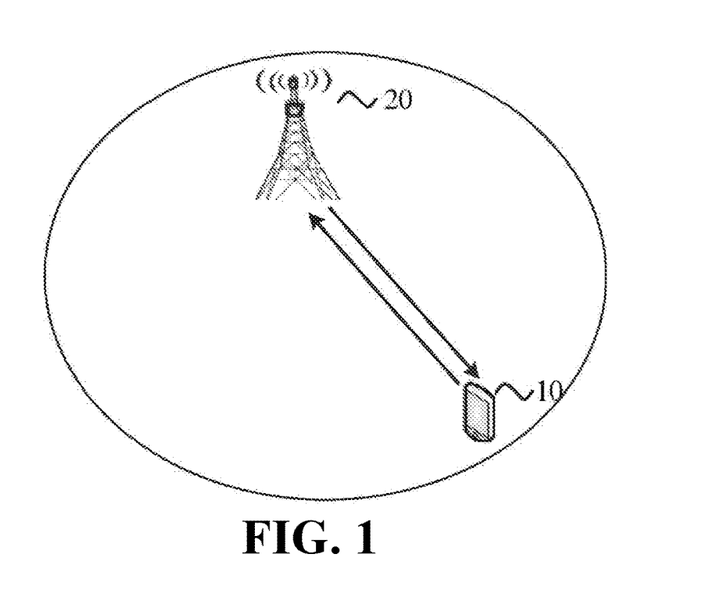
FIG. 1 shows a schematic diagram of an application scenario according to an implementation of the present disclosure.

FIG. 1 is a schematic diagram of an application scenario according to an implementation of the present disclosure. A communication system in FIG. 1 may include a terminal device 10 and a network device 20. The network device 20 is used for providing communication services for the terminal device 10 and access to a core network. The terminal device 10 accesses the network by searching for a synchronization signal, or a broadcast signal, etc., sent by the network device 20 to communicate with the network. Arrows shown in FIG. 1 may represent uplink/downlink transmission through cellular links between the terminal device 10 and the network device 20.

For uplink signals, power control of a terminal is of great significance in power saving and inter-cell interference suppression. Therefore, uplink power control is a focus of LTE. Uplink power control in a cell includes controlling powers of PUSCH, PUCCH, PRACH, and sounding reference signal (SRS).

In 5G, uplink beam management may be performed based on SRS, that is, a terminal device will use different beams to send SRS signals on multiple SRS resources. At the same time, a beam-based power control approach is introduced into the 5G. To select a reasonable transmission power, signals sent using different beams may have independent power control parameters so as to obtain different transmission powers. At this time, since different beams are adopted for multiple SRS resources of the terminal device, independent power control parameters may be configured to obtain transmission powers. Other uplink signals sent by the terminal device, such as PUSCH/PUCCH, may use the same beam as that used for a SRS signal on one certain SRS resource. How to determine transmission powers of these uplink signals according to beams used is a problem to be solved.

Figure 2:
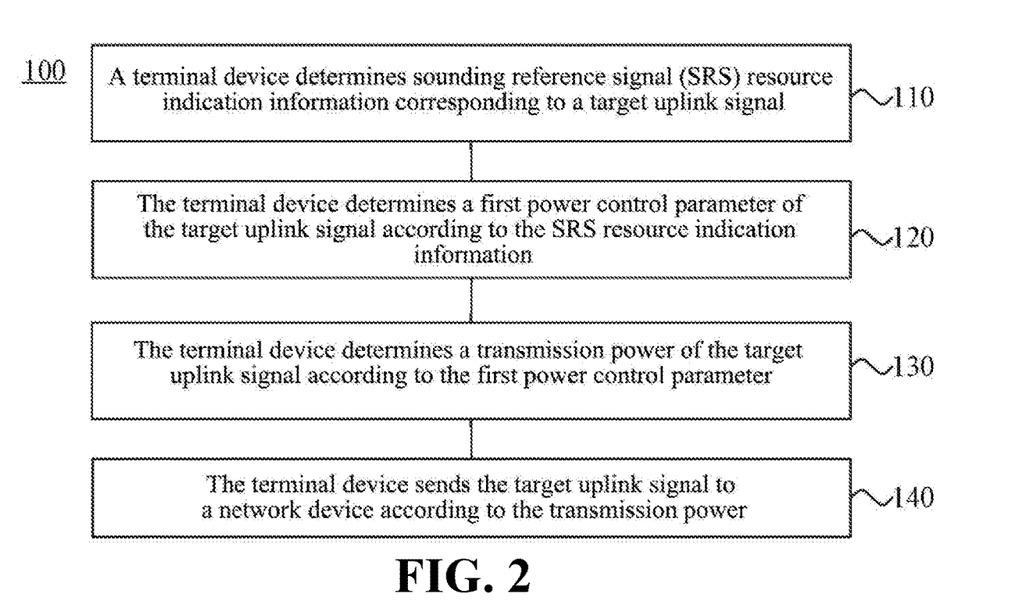
FIG. 2 shows a schematic block diagram of a method for transmitting signals according to an implementation of the present disclosure.

FIG. 2 is a schematic block diagram of a method 100 for transmitting signals according to an implementation of the present disclosure. As shown in FIG. 2, the method 100 includes acts S110-S140.

In S110, a terminal device determines sounding reference signal (SRS) resource indication information corresponding to a target uplink signal.

In S120, the terminal device determines a first power control parameter of the target uplink signal according to the SRS resource indication information.

In S130, the terminal device determines a transmission power of the target uplink signal according to the first power control parameter.

In S140, the terminal device sends the target uplink signal to a network device according to the transmission power.

A network device may preconfigure one or more SRS resources or agree on one or more SRS resources through a protocol, SRSs sent on different SRS resources may adopt different beams, and the network device may also preconfigure a corresponding relationship between the one or more SRS resources and power control parameters or stipulate a corresponding relationship between the one or more SRS resources and power control parameters through a protocol. That is, each SRS resource may correspond to a set of independent power control parameters. Then the network device may indicate to a terminal device that a beam corresponds to which SRS resource to transmit a target uplink signal, so that the terminal device may obtain a power control parameter corresponding to the SRS resource indicated by the network device through the corresponding relationship between the SRS resources and the power control parameters. Then the terminal device may make some adjustments based on the power control parameter indicated by the network device to determine a power control parameter of the target uplink signal or may directly determine the power control parameter indicated by the network device as the power control parameter of the target uplink signal.

Therefore, the method for transmitting signals according to the implementation of the present disclosure determines a transmission power of the target uplink signal by referring to the power control parameter corresponding to SRS resource indication information sent by the network device, which is beneficial to improving the accuracy of uplink power control and thus improving transmission performance of the system.

It should be understood that the target uplink signal may be PUSCH, PUCC, PRACH, and SRS mentioned above. The target uplink signal may be PTRS or DMRS, etc. The implementations of the present disclosure do not limit a type of the target uplink signal, and a transmission power may be calculated using the technical solutions of the implementations of the present disclosure as long as it is an uplink signal.

In the implementation of the present disclosure, the "corresponding" in sounding reference signal (SRS) resource indication information corresponding to the target uplink signal may refer to that the network device and the terminal device have agreed in advance or the network device has configured that some indication way belongs to a specific uplink signal. For example, it may be agreed that a certain specific field in Downlink Control Information (DCI) used for scheduling PUSCH is SRS resource indication information corresponding to the PUSCH.

In addition, those skilled in the art understand that SRS resource indication information may be indication information for indicating a SRS resource. For example, a network device and a terminal device have agreed in advance on four types of SRS resources, and each of the four types of SRS resources have independent power control parameters respectively, then the network device and the terminal device may further agree in advance to use two bits to indicate the four types of SRS resources. Indication information corresponding to SRS resource 1 is 00, indication information corresponding to SRS resource 2 is 01, indication information corresponding to SRS resource 3 is 10, and indication information corresponding to SRS resource 4 is 11.

In the implementation of the present disclosure, a terminal device may directly obtain a reference power control parameter corresponding to a target uplink signal. For example, in a case that a network device expects the terminal device to use which beam to send PUSCH, the network device may carry an indication of a reference power control parameter corresponding to a SRS resource using the beam in DCI for scheduling the PUSCH. Similarly, the network device and the terminal device may agree in advance that a certain specific field in the DCI for scheduling the PUSCH is used for indicating the reference power control parameter of the PUSCH, so that the terminal device may directly obtain the reference power control parameter of the PUSCH without indirectly obtaining the reference power control parameter through a corresponding relationship between SRS resources and reference power control parameters. It should be understood that the "reference power control parameter" herein refers to a power control parameter used for sending SRS on a certain SRS resource.

It should also be understood that the first power control parameter in the implementation of the present disclosure may be any one or any combination of multiple parameters in a calculation formula for transmission power. For example, the calculation formula for the transmission power generally includes a maximum allowable transmission power of a terminal device, a power offset, a transmission bandwidth of an uplink signal on a subframe, a target reception power, a path loss compensation factor, a closed-loop power adjustment amount, path loss, etc.

SRSs sent on different SRS resources may adopt different beams. That is, there is a corresponding relationship between at least two of beams, SRS resources, SRS resource indication information, and power control parameters.

By referring to the power control parameter corresponding to the SRS resource indicated by the network device, a better transmission power for the target uplink signal may be determined under a condition that the same beam is used for sending a SRS on the SRS resource indicated by the network device, thereby improving the transmission performance of the system.

The following will respectively describe in detail the obtaining of SRS resource indication information corresponding to the above-mentioned various target uplink signals.

A network device may send the SRS resource indication information to a terminal device. The terminal device receives first information sent by the network device, and the first information carries the SRS resource indication information. Determining, by the terminal device, the sounding reference signal (SRS) resource indication information corresponding to the target uplink signal, includes: the terminal device determines the SRS resource indication information from the first information.

It should be understood that the first information may be a high layer signaling such as an RRC signaling, a MAC signaling, a DCI signaling, system information.

Implementation one: in a case that the target uplink signal is a physical uplink shared channel (PUSCH), the first information is downlink control information (DCI) for scheduling the PUSCH. Those skilled in the art know that DCI may have various formats for transferring different controls, and a network device may agree with a terminal device that a certain indication field of DCI used for scheduling the PUSCH is used for transmitting the SRS resource indication information.

In a case that the target uplink signal is a physical uplink shared channel (PUSCH), the first information may further be an RRC signaling or a MAC signaling, or system information, etc.

Implementation two: in a case that the target uplink signal is a physical random access channel (PRACH), the first information may be system information or a high layer signaling. PRACH is used for sending a random access message to establish an RRC connection. Before an initialization of random access, a terminal device may receive information through system information such as broadcast information. After the initialization of random access, the terminal device may receive information through a higher layer signaling. Therefore, the terminal device may receive SRS resource indication information corresponding to the PRACH through system information or a high layer signaling. The system information may be Other System Information (OSI) or Remaining System Information (RMSI).

Implementation three: in a case that the target uplink signal is a sounding reference signal (SRS), the first information may be a high layer signaling or downlink control information (DCI). Similarly, a network device and a terminal device may agree in advance that a certain specific domain in a high layer signaling or DCI is used for indicating SRS resource indication information corresponding to the SRS. For example, in a case that the target uplink signal is an aperiodic SRS, the terminal device may obtain SRS resource indication information corresponding to the aperiodic SRS from DCI triggering transmission of the aperiodic SRS. For another example, in a case that the target uplink signal is a periodic SRS, the network device may carry SRS resource indication information corresponding to the periodic SRS in an RRC signaling configuring a type of the SRS. For another example, when the terminal device detects that a DCI format is a first format, SRS resource indication information carried in the DCI format may be considered to be SRS resource indication information corresponding to a SRS triggered under the DCI format. When the terminal device detects that the DCI format is a second format, SRS resource indication information carried in the DCI format may be considered to be SRS resource indication information corresponding to a SRS triggered under the DCI format, etc.

Implementation four: in a case that the target uplink signal is a phase tracking reference signal (PTRS), determining, by the terminal device, the sounding reference signal (SRS) resource indication information corresponding to the target uplink signal, includes: the terminal device determines SRS resource indication information corresponding to a first PUSCH as SRS resource indication information corresponding to the PTRS, wherein a demodulation reference signal (DMRS) for demodulating the first PUSCH has an association relationship with the PTRS. It should be understood that the association relationship may be a corresponding relationship configured at a network side, for example, each PTRS port corresponds to one DMRS port. The association relationship may further be an association relationship in spatial parameters, i.e., a DMRS and the PTRS are quasi-co-location in spatial parameters.

In other words, a network device and a terminal device may agree that SRS resource indication information corresponding to some types of uplink signals may be the same. For example, once the terminal device obtains SRS resource indication information corresponding to a PUSCH, the terminal device may consider that the SRS resource indication information may also be SRS resource indication information of a PTRS, that is, after obtaining the SRS resource indication information corresponding to the PUSCH, the terminal device may determine a first power control parameter of the PTRS according to the SRS resource indication information of the PUSCH, and further may determine a transmission power of the PTRS. Similarly, the terminal device may determine SRS resource indication information of a PUCCH as the resource indication information of the PUSCH after obtaining the SRS resource indication information of the PUCCH.

Implementation five: in a case that the target uplink signal is a physical uplink control channel (PUCCH), the first information is a high layer signaling for indicating a PUCCH resource; or in a case that the target uplink signal is a physical uplink control channel (PUCCH), the first information is downlink control information (DCI) latest received by the terminal device for scheduling a physical uplink shared channel (PUSCH); or in a case that the target uplink signal is a physical uplink control channel (PUCCH), the first information is downlink control information (DCI) carrying a Transmit Power Control (TPC) command for indicating a closed-loop power adjustment value of the PUCCH; or in a case that the target uplink signal is a physical uplink control channel (PUCCH), the first information is an RRC signaling or a medium access control (MAC) signaling.

For the terminal device, resource blocks reserved for a PUCCH in one subframe are generally semi-statically configured. That is, the network device carries the SRS resource indication information in an RRC signaling for configuring PUCCH resources to the terminal device. It should be understood that the network device may not be limited to indicate together with PUCCH resources, but may indicate through other RRC signaling or MAC signaling.

The network device may further indicate a TPC command together with SRS resource indication information to the terminal device, that is, the SRS resource indication information is carried in DCI carrying the TPC command, for example, DCI format 0 or DCI format 1A. The network device may not be limited to indicate together with a TPC command, but may indicate through other DCI. For example, the network device may obtain SRS resource indication information of a PUCCH from DCI latest received by the terminal device for scheduling a PUSCH, which is not limited by the implementations of the present disclosure.

Implementation six: in a case that the target uplink signal is a physical uplink control channel (PUCCH), determining, by the terminal device, the sounding reference signal (SRS) resource indication information corresponding to the target uplink signal, includes: the terminal device determines the SRS resource indication information corresponding to a format of the PUCCH according to a format of the PUCCH.

The network device may preconfigure that different PUCCH formats correspond to different SRS resource indication information. For example, the network device may configure that PUCCH format 1 corresponds to 000, PUCCH format 1a corresponds to 001, etc., 000 is used for indicating SRS resource 0, 001 is used for indicating SRS resource 1, etc. And the network device may inform the terminal device of this configuration mode, so when the terminal device needs to use which format of the PUCCH, it may know what SRS resource indication information corresponding to the format of the PUCCH is, and then it may know corresponding reference power control parameters, to calculate a transmission power used in sending the PUCCH.

It should be understood that the above correspondence between PUCCH formats and SRS resource indication information may be applied to other uplink signals, for example, PRACH formats may correspond to SRS resource indication information. It should also be understood that the above-mentioned network device configures different SRS resource indication information for different PUCCH formats. Similarly, the network device may directly configure different SRS resources or different power control parameters, etc. for different PUCCH formats. The implementations of the present disclosure are not limited thereto.

In the implementation of the present disclosure, determining, by the terminal device, the first power control parameter of the target uplink signal according to the SRS resource indication information, includes: the terminal device determines a power control parameter corresponding to a SRS resource indicated by the SRS resource indication information as a first power control parameter of the target uplink signal.

The terminal device may directly determine a power control parameter corresponding to a SRS resource indicated by the network device as the first power control parameter of the target uplink signal. For example, the target uplink signal may adopt the same path loss value as a SRS sent on a SRS resource indicated by the SRS resource indication information. Or, the terminal device may determine a power control parameter corresponding to a SRS resource indicated by the network device plus a certain offset as the first power control parameter of the target uplink signal.

In the implementation of the present disclosure, the first power control parameter includes at least one of following: a path loss value for calculating the transmission power, information about a downlink signal for measuring a path loss value for calculating the transmission power, an open-loop power control parameter, and a closed-loop power control parameter.

The information of the downlink signal for measuring the path loss value for calculating the transmission power may be considered as path loss reference correlation information. That is, it may be a subset of downlink signals used for estimating path loss of the target uplink signal. For example, path loss reference correlation information for a PUSCH may refer to which downlink pilot signals in a configuration set of downlink pilot signals are used for measuring path loss to estimate path loss of the PUSCH. For example, the target uplink signal may use the same downlink signal as a SRS sent on a SRS resource indicated by the SRS resource indication information to measure a path loss value, for example, the same channel state information-reference signals (CSI-RSs) are used to measure the path loss value. The downlink signal may be a synchronization signal or a Physical Broadcast Channel (PBCH) or the like.

The power control parameter may be a target power $P_O$, or a path loss factor a, or a closed-loop power control factor f(i), etc.

In the implementation of the present disclosure, before the terminal device determines the sounding reference signal (SRS) resource indication information corresponding to the target uplink signal, the method further includes: the terminal device receives configuration information sent by the network device, the configuration information is used for indicating a corresponding relationship between at least one SRS resource and at least one power control parameter, and the at least one SRS resource includes a SRS resource indicated by the SRS resource indication information.

A network side may configure N SRS resources for a terminal and a power control parameter used for each SRS resource to send a SRS, wherein the N SRS resources include SRS resources indicated to the terminal by the network. Here N may be an integer greater than or equal to 1. Similarly, the network device may preconfigure each SRS resource and corresponding SRS resource indication information and inform the terminal device of the corresponding relationship, or the corresponding relationship may be agreed by the protocol.

In the implementation of the present disclosure, the method further includes: the terminal device determines a transmission power of the target uplink signal by using a power control parameter preconfigured by the network device.

In other words, in a case that a terminal does not receive SRS resource indication information sent by a network side, the terminal adopts a power control parameter preconfigured by the network side for the target uplink signal until the SRS resource indication information is received. After receiving the SRS resource indication information, a power control parameter used for sending a SRS on a SRS resource indicated by the SRS resource indication information is adopted to replace a value preconfigured by the network side.

In the implementation of the present disclosure, determining, by the terminal device, the first power control parameter of the target uplink signal according to the SRS resource indication information, includes: the terminal device determines the first power control parameter of the target uplink signal according to the SRS resource indication information and an uplink multiple access mode used for the target uplink signal.

The terminal device may determine the first power control parameter of the target uplink signal according to a power control parameter corresponding to a SRS resource indicated by the SRS resource indication information and an uplink multiple access mode used for the target uplink signal. The uplink multiple access mode used by the target uplink signal is DFT-S-OFDM or Cyclic Prefix-Orthogonal Frequency Division Multiplexing (CP-OFDM). For example, in a case that the uplink multiple access mode used for the target uplink signal is DFT-S-OFDM, a power control parameter indicated by the SRS resource indication information is directly adopted as the first power control parameter of the target uplink signal; in a case that the uplink multiple access mode used for the target uplink signal is CP-OFDM, the power control parameter indicated by the SRS resource indication information plus a certain offset value is determined to be the first power control parameter of the target uplink signal.

In the implementation of the present disclosure, determining, by the terminal device, the transmission power of the target uplink signal according to the first power control parameter, includes: the terminal device determines the transmission power of the target uplink signal according to the first power control parameter, and a second power control parameter preconfigured by the network device for the target uplink signal.

For example, the first power control parameter may include a path loss value used for determining a transmission power, and the second power control parameter may include an open-loop power control parameter and a closed-loop power control parameter. For another example, the first power control parameter may include an open-loop power control parameter, and the second power control parameter may include a closed-loop power control parameter. For another example, the first power control parameter may include a path loss value and a target power $P_O$, and the second power control parameter may include other power control parameters (e.g., a path loss factor a and a closed-loop power control factor f(i)).

Take a calculation formula of uplink transmission power control of a PUSCH as an example.

In a case that a terminal device sends a PUSCH on a subframe i of a serving cell c without sending a PUCCH, a power $P_{PUSCH,c}(i)$ for the user equipment to send the PUSCH on the subframe i of the serving cell c is:

$$P_{PUSCH,c}(i) = \min\left\{\begin{array}{l}P_{CMAX,c}(i), \\ 10\log_{10}(M_{PUSCH,c}(i)) + P_{0\_PUSCH,c}(j) + \alpha_c(j) \cdot PL_c + \\ \Delta_{TF,c}(i) + f_c(i)\end{array}\right\}$$

In a case that the terminal device sends a PUSCH on a subframe i of a serving cell c and simultaneously sends a PUCCH, a power $P_{PUSCH,c}(i)$ for the user equipment to send the PUSCH on the subframe i of the serving cell c is:

$$P_{PUSCH,c}(i) = \min\left\{\begin{array}{l}10\log_{10}(\hat{P}_{CMAX,c}(i) - \hat{P}_{PUCCH}(i)), \\ 10\log_{10}(M_{PUSCH,c}(i)) + P_{0\_PUSCH,c}(j) + \alpha_c(j) \cdot PL_c + \\ \Delta_{TF,c}(i) + f_c(i)\end{array}\right\}$$

Where $M_{PUSCH,c}(i)$ is a quantity of RBs occupied by the PUSCH;
$P_{CMAX,c}(i)$ is a maximum transmission power of the subframe i on the serving cell c configured for the terminal device, and $\hat{P}_{CMAX,c}(i)$ is a linear value of $P_{CMAX,c}(i)$;
$\hat{P}_{PUCCH}(i)$ is a linear value of a transmission power of the PUCCH sent on the subframe i;
$P_{O\_PUSCH,c}(j)$ and $\alpha_c(j)$ are values determined by the terminal device through a high layer signaling;
$PL_c$ is a path loss value from the serving cell c to the terminal device measured by the terminal device.
$\Delta_{TF,c}(i)$ is a value determined by the terminal device according to a ratio of a quantity of bits of uplink data sent by the PUSCH to a quantity of resource elements included in the PUSCH; $f_c(i)$ is a value determined by the terminal device according to a power adjustment command to the PUSCH.

From the above formula, it may be seen that in a case that the first power control parameter is a path loss value $PL_c$ and a network device does not configure a second power control parameter for a terminal device, then the terminal device only needs to adjust an uplink transmission power of the PUSCH according to the path loss value corresponding to SRS resource indication information sent by a network and other default parameters. Or in a case that the first power control parameter is a path loss value $PL_c$ and a network device configures a second power control parameter $f_c(i)$ for a terminal device, then the terminal device may adjust an uplink transmission power of the PUSCH according to the path loss value corresponding to SRS resource indication information sent by a network, $f_c(i)$ configured by the network device and other default parameters.

Figure 3:
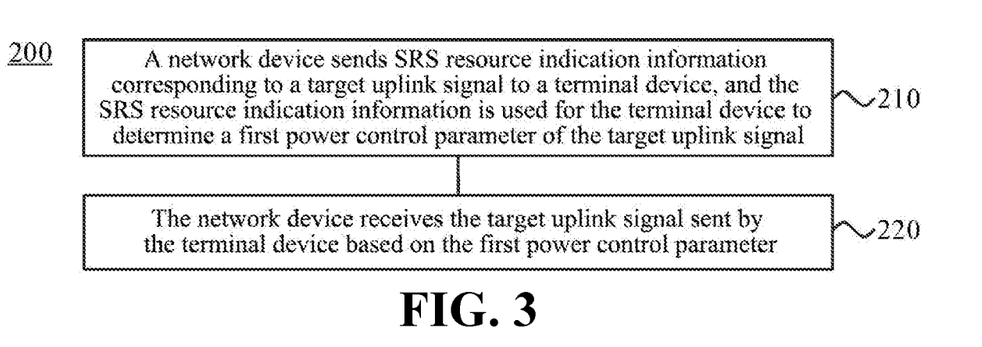
FIG. 3 shows another schematic block diagram of a method for transmitting signals according to an implementation of the present disclosure.

FIG. 3 is a schematic block diagram of a method 200 for transmitting signals according to an implementation of the present disclosure. As shown in FIG. 3, the method 200 includes acts S210 and S220.

In S210, a network device sends SRS resource indication information corresponding to a target uplink signal to a terminal device, and the SRS resource indication information is used for the terminal device to determine a first power control parameter of the target uplink signal.

In S220, the network device receives the target uplink signal sent by the terminal device based on the first power control parameter.

Therefore, in the method for transmitting signals according to the implementation of the present disclosure, a transmission power of a target uplink signal is determined by referring to a power control parameter corresponding to SRS resource indication information sent by a network device, which is beneficial to improving accuracy of uplink power control and thus improving transmission performance of a system.

In the implementation of the present disclosure, the target uplink signal is a physical uplink shared channel (PUSCH), a physical uplink control channel (PUCCH), a physical random access channel (PRACH), a phase tracking reference signal (PTRS), or a sounding reference signal (SRS).

In the implementation of the present disclosure, in a case that the target uplink signal is a physical uplink shared channel (PUSCH), the SRS resource indication information is carried in downlink control information (DCI) for scheduling the PUSCH; or in a case that the target uplink signal is a physical random access channel (PRACH), the SRS resource indication information is carried in system information or a high layer signaling; or in a case that the target uplink signal is a sounding reference signal (SRS), the SRS resource indication information is carried in a high layer signaling or downlink control information (DCI).

In the implementation of the present disclosure, in a case that the target uplink signal is a physical uplink control channel (PUCCH), the SRS resource indication information is carried in a high layer signaling for indicating resources of the PUCCH; or in a case that the target uplink signal is a physical uplink control channel (PUCCH), the SRS resource indication information is carried in downlink control information (DCI) latest received by the terminal device for scheduling a physical uplink shared channel (PUSCH); or in a case that the target uplink signal is a physical uplink control channel (PUCCH), the SRS resource indication information is carried in downlink control information (DCI) carrying a transmit power control (TPC) command for indicating a closed-loop power adjustment value of the PUCCH; or in a case that the target uplink signal is a physical uplink control channel (PUCCH), the SRS resource indication information is carried in a radio resource control (RRC) signaling or a medium access control (MAC) signaling.

In the implementation of the present disclosure, the first power control parameter includes at least one of following: a path loss value for calculating the transmission power, information about a downlink signal for measuring a path loss value for calculating the transmission power, an open-loop power control parameter, and a closed-loop power control parameter.

In the implementation of the present disclosure, the method further includes: the network device sends configuration information to the terminal device, the configuration information is used for indicating a corresponding relationship between at least one sounding reference signal (SRS) resource and at least one power control parameter, and the at least one SRS resource includes a SRS resource indicated by the SRS resource indication information.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

It should be understood that the interaction with the terminal device, related characteristics, and functions of the network device, etc. correspond to related characteristics and functions of the terminal device. Moreover, the related contents have been described in detail in the method 100, and will not be repeated here for the sake of brevity.

It should be understood that in various implementations of the present disclosure, values of sequence numbers in the aforementioned processes do not indicate an order of execution, and the order of execution of various processes should be determined by their functions and internal logics, and should not constitute any limitation on implementation processes of implementations of the present disclosure.

The methods for transmitting signals according to the implementations of the present disclosure have been described in detail above. Apparatuses for transmitting signals according to the implementations of the present disclosure will be described below with reference to FIGS. 4 to 7. The technical features described in the method implementations are applicable to following apparatus implementations.

Figure 4:
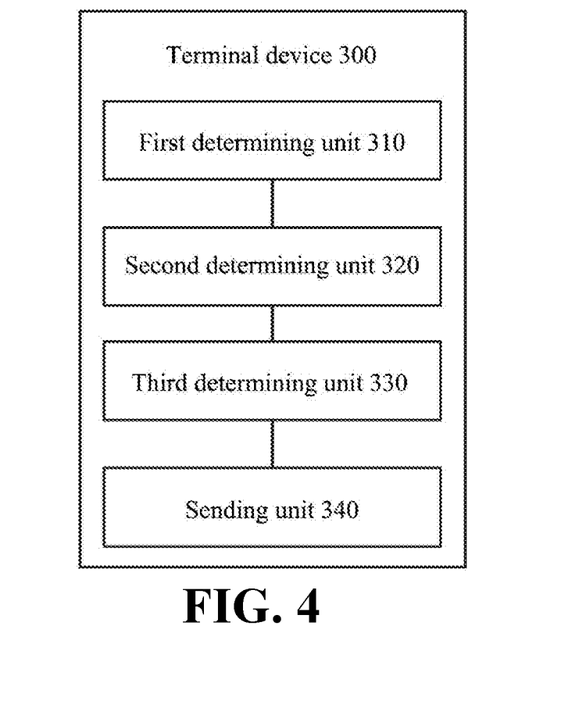
FIG. 4 shows a schematic block diagram of a terminal device according to an implementation of the present disclosure.

FIG. 4 shows a schematic block diagram of a terminal device 300 of an implementation of the present disclosure. As shown in FIG. 4, the terminal device 300 includes a first determining unit 310, a second determining unit 320, a third determining unit 330 and a sending unit 340.

The first determining unit 310 is used for determining sounding reference signal (SRS) resource indication information corresponding to a target uplink signal.

The second determining unit 320 is used for determining a first power control parameter of the target uplink signal according to the SRS resource indication information.

The third determining unit 330 is used for determining a transmission power of the target uplink signal according to the first power control parameter.

The sending unit 340 is used for sending the target uplink signal to a network device according to the transmission power.

Therefore, the terminal device of the implementation of the present disclosure is beneficial to improving accuracy of power control, thereby improving transmission performance of a system.

In the implementation of the present disclosure, the target uplink signal is a physical uplink shared channel (PUSCH), a physical uplink control channel (PUCCH), a physical random access channel (PRACH), a phase tracking reference signal (PTRS), or a sounding reference signal (SRS).

In the implementation of the present disclosure, the terminal device 300 further includes: a first receiving unit, used for receiving first information sent by the network device, wherein the first information carries the SRS resource indication information. The first determining unit 310 is used for determining the SRS resource indication information from the first information.

In the implementation of the present disclosure, in a case that the target uplink signal is a physical uplink shared channel (PUSCH), the first information is downlink control information (DCI) for scheduling the PUSCH; or in a case that the target uplink signal is a physical random access channel (PRACH), the first information is system information or a high layer signaling; or in a case that the target uplink signal is a sounding reference signal (SRS), the first information is a high layer signaling or downlink control information (DCI).

In the implementation of the present disclosure, in a case that the target uplink signal is a physical uplink control channel (PUCCH), the first information is a high layer signaling for indicating a resource of the PUCCH; or in a case that the target uplink signal is a physical uplink control channel (PUCCH), the first information is downlink control information (DCI) latest received by the terminal device for scheduling a physical uplink shared channel (PUSCH); or in a case that the target uplink signal is a physical uplink control channel (PUCCH), the first information is downlink control information (DCI) carrying a Transmit Power Control (TPC) command for indicating a closed-loop power adjustment value of the PUCCH; or in a case that the target uplink signal is a physical uplink control channel (PUCCH), the first information is a radio resource control (RRC) signaling or a media access control (MAC) signaling.

In the implementation of the present disclosure, in a case that the target uplink signal is a physical uplink control channel (PUCCH), the first determining unit 310 is used for determining SRS resource indication information corresponding to a format of the PUCCH according to the format of the PUCCH.

In the implementation of the present disclosure, in a case that the target uplink signal is a phase tracking reference signal (PTRS), the first determining unit 310 is used for determining SRS resource indication information corresponding to a first PUSCH as SRS resource indication information corresponding to the PTRS, wherein a demodulation reference signal (DMRS) for demodulating the first PUSCH has an association relationship with the PTRS.

In the implementation of the present disclosure, the second determining unit 320 is used for determining a power control parameter corresponding to a SRS resource indicated by the SRS resource indication information as the first power control parameter of the target uplink signal.

In the implementation of the present disclosure, the first power control parameter includes at least one of following: a path loss value for calculating the transmission power, information about a downlink signal for measuring a path loss value for calculating the transmission power, an open-loop power control parameter, and a closed-loop power control parameter.

In the implementation of the present disclosure, the terminal device 300 further includes a second receiving unit, used for receiving configuration information sent by the network device, the configuration information is used for indicating a corresponding relationship between at least one SRS resource and at least one power control parameter, and the at least one SRS resource includes a SRS resource indicated by the SRS resource indication information.

In the implementation of the present disclosure, the terminal device 300 further includes a fourth determining unit, used for determining a transmission power of the target uplink signal by using a power control parameter preconfigured by the network device.

In the implementation of the present disclosure, the second determining unit 320 is used for determining the first power control parameter of the target uplink signal according to the SRS resource indication information and an uplink multiple access mode used for the target uplink signal.

In the implementation of the present disclosure, the second determining unit 320 is used for determining the first power control parameter of the target uplink signal according to a power control parameter corresponding to a SRS resource indicated by the SRS resource indication information and an uplink multiple access mode used for the target uplink signal.

In the implementation of the present disclosure, the uplink multiple access mode used for the target uplink signal is Discrete Fourier transform-Spread-Orthogonal Frequency Division Multiplexing (DFT-S-OFDM) or Cyclic Prefix-Orthogonal Frequency Division Multiplexing (CP-OFDM).

In the implementation of the present disclosure, the third determining unit 330 is used for determining a transmission power of the target uplink signal according to the first power control parameter, and a second power control parameter preconfigured by the network device for the target uplink signal.

It should be understood that the terminal device 300 according to the implementation of the present disclosure may correspond to the terminal device in the method implementation of the present disclosure, and the above-mentioned and other operations and/or functions of various units in the terminal device 300 are respectively for implementing the corresponding processes of the terminal device in the method shown in FIG. 2, and will not be repeated here for brevity.

Figure 5:
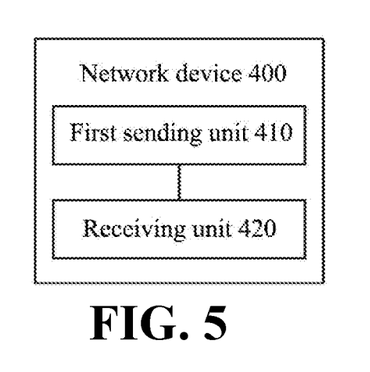
FIG. 5 shows a schematic block diagram of a network device according to an implementation of the present disclosure.

FIG. 5 shows a schematic block diagram of a network device 400 according to an implementation of the present disclosure. As shown in FIG. 5, the network device 400 includes a first sending unit 410, a receiving unit 420.

The first sending unit 410 is used for sending SRS resource indication information corresponding to a target uplink signal to the terminal device, wherein the SRS resource indication information is used for the terminal device to determine a first power control parameter of the target uplink signal.

The receiving unit 420 is used for receiving the target uplink signal sent by the terminal device based on the first power control parameter.

Therefore, the network device of the implementation of the present disclosure is beneficial to improving accuracy of power control, thereby improving transmission performance of a system.

In the implementation of the present disclosure, the target uplink signal is a physical uplink shared channel (PUSCH), a physical uplink control channel (PUCCH), a physical random access channel (PRACH), a phase tracking reference signal (PTRS), or a sounding reference signal (SRS).

In the implementation of the present disclosure, in a case that the target uplink signal is a physical uplink shared channel (PUSCH), the SRS resource indication information is carried in downlink control information (DCI) for scheduling the PUSCH; or in a case that the target uplink signal is a physical random access channel (PRACH), the SRS resource indication information is carried in system information or a high layer signaling; or in a case that the target uplink signal is a sounding reference signal (SRS), the SRS resource indication information is carried in a high layer signaling or downlink control information (DCI).

In the implementation of the present disclosure, in a case that the target uplink signal is a physical uplink control channel (PUCCH), the SRS resource indication information is carried in a high layer signaling for indicating resources of the PUCCH; or in a case that the target uplink signal is a physical uplink control channel (PUCCH), the SRS resource indication information is carried in downlink control information (DCI) latest received by the terminal device for scheduling a physical uplink shared channel (PUSCH); or in a case that the target uplink signal is a physical uplink control channel (PUCCH), the SRS resource indication information is carried in downlink control information (DCI) carrying a transmit power control (TPC) command for indicating a closed-loop power adjustment value of the PUCCH; or in a case that the target uplink signal is a physical uplink control channel (PUCCH), the SRS resource indication information is carried in a radio resource control (RRC) signaling or a medium access control (MAC) signaling.

In the implementation of the present disclosure, the first power control parameter includes at least one of following: a path loss value for calculating the transmission power, information about a downlink signal for measuring a path loss value for calculating the transmission power, an open-loop power control parameter, and a closed-loop power control parameter.

In the implementation of the present disclosure, the network device 400 further includes a second sending unit, used for sending configuration information to the terminal device, wherein the configuration information is used for indicating a corresponding relationship between at least one sounding reference signal (SRS) resource and at least one power control parameter, and the at least one SRS resource includes a SRS resource indicated by the SRS resource indication information.

It should be understood that the network device 400 according to the implementation of the present disclosure may correspond to the terminal device in the method implementations of the present disclosure, and the above-mentioned and other operations and/or functions of various units in the device 400 are respectively for implementing the corresponding processes of the network device in the method shown in FIG. 3, and will not be repeated here for the sake of brevity.

Figure 6:
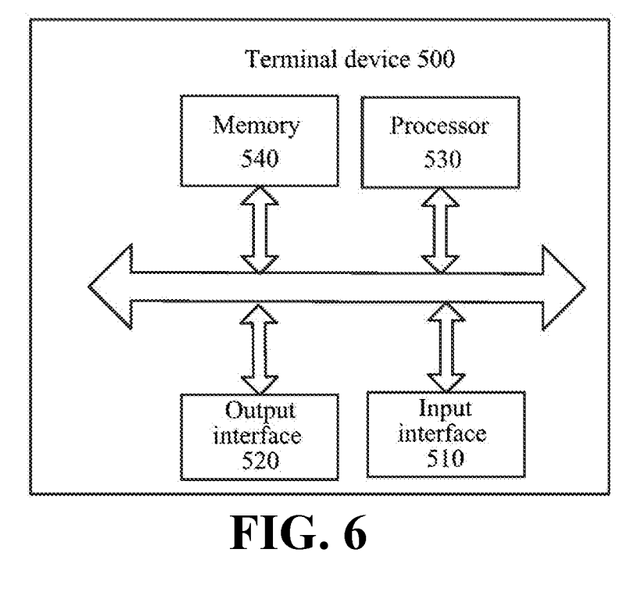
FIG. 6 shows another schematic block diagram of a terminal device according to an implementation of the present disclosure.

As shown in FIG. 6, the implementation of the present disclosure further provides a terminal device 500, which may be the terminal device 300 in FIG. 4 and may be used for executing the contents of the terminal device corresponding to the method 100 in FIG. 2. The terminal device 500 includes an input interface 510, an output interface 520, a processor 530, and a memory 540. The input interface 510, the output interface 520, the processor 530, and the memory 540 may be connected through a bus system. The memory 540 is used for storing programs, instructions, or codes. The processor 530 is used for executing programs, instructions, or codes in the memory 540 to control the input interface 510 to receive signals, to control the output interface 520 to send signals, and to implement the operations in the foregoing method implementations.

Therefore, the terminal device of the implementation of the present disclosure determines a transmission power of a target uplink signal by referring to a power control parameter corresponding to SRS resource indication information sent by a network device, which is beneficial to improving accuracy of uplink power control, and thus improving transmission performance of a system.

It should be understood that in the implementation of the present disclosure, the processor 530 may be a Central Processing Unit (CPU), or the processor 530 may be other general purpose processor, a digital signal processors (DSP), an application specific integrated circuit (ASIC), a field programmable gate array (FPGA) or other programmable logic devices, discrete gates or transistor logic devices, discrete hardware components, etc. The general purpose processor may be a microprocessor, or the processor may be any conventional processor or the like.

The memory 540 may include a read only memory and a random access memory, and provide instructions and data to the processor 530. A portion of the memory 540 may include non-volatile random access memory. For example, the memory 540 may also store type information of a device.

In implementation processes, various contents of the methods described above may be accomplished by integrated logic circuits of hardware or instructions in the form of software in the processor 530. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, a flash memory, a read-only memory, a programmable read-only memory or an electrically erasable programmable memory, or a register. The storage medium is located in the memory 540, and the processor 530 reads the information in the memory 540, and accomplishes the contents of the above method in combination with its hardware. To avoid repetition, it will not be described in detail here.

In a specific implementation, the first determining unit, the second determining unit, the third determining unit, and the fourth determining unit in the terminal device 300 may be implemented by the processor 530 in FIG. 6, the sneding unit of the terminal device 300 may be implemented by the output interface 520 in FIG. 6, and the first receiving unit and the second receiving unit of the terminal device 300 may be implemented by the input interface 510 in FIG. 6.

Figure 7:
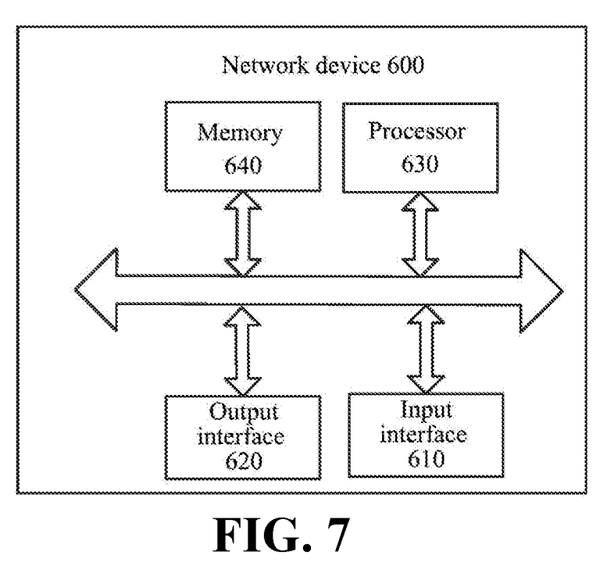
FIG. 7 shows another schematic block diagram of a network device according to an implementation of the present disclosure.

As shown in FIG. 7, the implementation of the present disclosure further provides a network device 600, which may be the network device 400 in FIG. 5, and may be used for executing the contents of the network device corresponding to the method 200 in FIG. 3. The network device 600 includes an input interface 610, an output interface 620, a processor 630, and a memory 640. The input interface 610, the output interface 620, the processor 630, and the memory 640 may be connected through a bus system. The memory 640 is used for storing programs, instructions, or codes. The processor 630 is used for executing programs, instructions, or codes in the memory 640 to control the input interface 610 to receive signals, to control the output interface 620 to send signals, and to complete the operations in the foregoing method implementations.

Therefore, the network device of the implementation of the present disclosure is beneficial to improving accuracy of power control, thereby improving transmission performance of a system.

It should be understood that in the implementation of the present disclosure, the processor 630 may be a Central Processing Unit (CPU), or the processor 630 may be other general purpose processor, a digital signal processors (DSP), an application specific integrated circuit (ASIC), a field programmable gate array (FPGA) or other programmable logic devices, discrete gates or transistor logic devices, discrete hardware components, etc. The general purpose processor may be a microprocessor or the processor may be any conventional processor or the like.

The memory 640 may include a read only memory and a random access memory, and provide instructions and data to the processor 630. A portion of the memory 640 may include a non-volatile random access memory. For example, the memory 640 may also store type information of a device.

In implementation processes, various contents of the methods described above may be accomplished by integrated logic circuits of hardware or instructions in the form of software in the processor 630. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, a flash memory, a read-only memory, a programmable read-only memory or an electrically erasable programmable memory, or a register. The storage medium is located in the memory 640, and the processor 630 reads the information in the memory 640, and accomplishes the contents of the above method in combination with its hardware. To avoid repetition, it will not be described in detail here.

In a specific implementation, the first sending unit and the second sending unit in the network device 400 may be implemented by the output interface 620 in FIG. 7, and the receiving unit in the network device 400 may be implemented by the input interface 610 in FIG. 7.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different approaches to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned method implementations, and details are not described herein again.

In several implementations provided by the present disclosure, it should be understood that the disclosed systems, apparatuses and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to actual needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium in a case that implemented in a form of software functional units and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of various implementations of the present disclosure. The aforementioned storage medium includes various media capable of storing program codes, such as a U disk, a mobile hard disk, a read-only memory (ROM), a random access memory (RAM), a magnetic disk, or an optical disk.

The foregoing are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure shall be the protection scope defined by the claims.

What is claimed is:

1. A method for transmitting signals, comprising:
   determining, by a terminal device, sounding reference signal (SRS) resource indication information corresponding to a target uplink signal, wherein the SRS resource indication information is used to indicate at least one SRS resource from multiple SRS resources and the target uplink signal is physical uplink shared channel (PUSCH), and wherein the SRS resource indication information is carried in downlink control information (DCI) for scheduling the PUSCH;
   determining, by the terminal device, a first power control parameter of the target uplink signal according to the SRS resource indication information, wherein there is a corresponding relationship between the SRS resource indication information and the first power control parameter;
   determining, by the terminal device, a transmission power of the target uplink signal according to the first power control parameter and a second power control parameter preconfigured by a network device for the target uplink signal; and
   sending, by the terminal device, the target uplink signal to a network device according to the transmission power.

2. The method according to claim 1, further comprising:
   receiving, by the terminal device, first information sent by the network device, wherein the first information carries the SRS resource indication information;
   wherein the determining, by the terminal device, the sounding reference signal (SRS) resource indication information corresponding to the target uplink signal, comprises:
   determining, by the terminal device, the SRS resource indication information from the first information.

3. The method according to claim 1, wherein the first power control parameter comprises at least one of the following: a path loss value for calculating the transmission power, information about a downlink signal for measuring a path loss value for calculating the transmission power, an open-loop power control parameter, or a closed-loop power control parameter.

4. The method according to claim 1, wherein the method further comprises:
   before the terminal device determines the sounding reference signal (SRS) resource indication information corresponding to the target uplink signal,
   receiving, by the terminal device, configuration information sent by the network device, wherein the configuration information is used for indicating a corresponding relationship between at least one SRS resource and at least one power control parameter, and the at least one SRS resource comprises a SRS resource indicated by the SRS resource indication information.

5. The method according to claim 1, wherein the method further comprises:

determining, by the terminal device, a transmission power of the target uplink signal by using a power control parameter preconfigured by the network device.

6. A method for transmitting signals, comprising:

sending, by a network device, sounding reference signal (SRS) resource indication information corresponding to a target uplink signal to a terminal device, wherein the SRS resource indication information is used for the terminal device to determine a first power control parameter of the target uplink signal, wherein the target uplink signal is physical uplink shared channel (PUSCH), and wherein the SRS resource indication information is carried in downlink control information (DCI) for scheduling the PUSCH; and receiving, by the network device, the target uplink signal sent by the terminal device based on the first power control parameter, wherein there is a corresponding relationship between the SRS resource indication information and the first power control parameter, wherein a transmission power of the target uplink signal is determined by the terminal device according to the first power control parameter and a second power control parameter preconfigured by the network device for the target uplink signal.

7. The method according to claim 6, wherein the first power control parameter comprises at least one of the following: a path loss value for calculating the transmission power, information about a downlink signal for measuring a path loss value for calculating the transmission power, an open-loop power control parameter, or a closed-loop power control parameter.

8. A terminal device, comprising a processor and an output interface, wherein the processor is configured to execute the following actions:

determining sounding reference signal (SRS) resource indication information corresponding to a target uplink signal, wherein the SRS resource indication information is used to indicate at least one SRS resource from multiple SRS resources and the target uplink signal is physical uplink shared channel (PUSCH), and wherein the SRS resource indication information is carried in downlink control information (DCI) for scheduling the PUSCH;

determining a first power control parameter of the target uplink signal according to the SRS resource indication information, wherein there is a corresponding relationship between the SRS resource indication information and the first power control parameter; and determining a transmission power of the target uplink signal according to the first power control parameter and a second power control parameter preconfigured by the network device for the target uplink signal; and wherein the output interface is configured to execute the following action:

sending the target uplink signal to a network device according to the transmission power.

9. The terminal device according to claim 8, wherein the terminal device further comprises:

an input interface, configured to execute the following action:

receiving first information sent by the network device, wherein the first information carries the SRS resource indication information; and wherein the processor is configured to execute the following action:

determining the SRS resource indication information from the first information.

10. The terminal device according to claim 8, wherein the first power control parameter comprises at least one of the following: a path loss value for calculating the transmission power, information about a downlink signal for measuring a path loss value for calculating the transmission power, an open-loop power control parameter, or a closed-loop power control parameter.

11. The terminal device according to claim 8, wherein the terminal device further comprises:

an input interface, configured to execute the following action:

receiving configuration information sent by the network device, wherein the configuration information is used for indicating a corresponding relationship between at least one SRS resource and at least one power control parameter, and the at least one SRS resource comprises a SRS resource indicated by the SRS resource indication information.

12. The terminal device according to claim 8, wherein the processor is further configured to execute the following action:

determining a transmission power of the target uplink signal by using a power control parameter preconfigured by the network device.

13. A network device, wherein the network device comprises an output interface and an input interface, wherein the output interface is configured to execute the following action:

sending sounding reference signal (SRS) resource indication information corresponding to a target uplink signal to a terminal device, wherein the SRS resource indication information is used for the terminal device to determine a first power control parameter of the target uplink signal, wherein the target uplink signal is physical uplink shared channel (PUSCH); and wherein the input interface is configured to execute the following action:

receiving the target uplink signal sent by the terminal device based on the first power control parameter, wherein there is a corresponding relationship between the SRS resource indication information and the first power control parameter, and wherein the SRS resource indication information is carried in downlink control information (DCI) for scheduling the PUSCH, wherein a transmission power of the target uplink signal is determined by the terminal device according to the first power control parameter and a second power control parameter preconfigured by the network device for the target uplink signal.

14. The network device according to claim 13, wherein the first power control parameter comprises at least one of the following: a path loss value for calculating the transmission power, information about a downlink signal for measuring a path loss value for calculating the transmission power, an open-loop power control parameter, or a closed-loop power control parameter.

* * * * *